(12) United States Patent
Tatsugi (10) Patent No.: US 9,738,041 B2
(45) Date of Patent: Aug. 22, 2017

(54) OPTICAL ELEMENT, IMAGE DISPLAY DEVICE AND METHOD FOR MANUFACTURING SAME

(71) Applicant: Seiko Epson Corporation, Tokyo (JP)

(72) Inventor: Hiroyuki Tatsugi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 222 days.

(21) Appl. No.: 14/525,865

(22) Filed: Oct. 28, 2014

(65) Prior Publication Data

US 2015/0138646 A1    May 21, 2015

(30) Foreign Application Priority Data

Nov. 15, 2013  (JP) ................... 2013-236596

(51) Int. Cl.
| | |
|---|---|
| *G02B 27/14* | (2006.01) |
| *B29D 11/00* | (2006.01) |
| *G02B 27/01* | (2006.01) |
| *F21V 8/00* | (2006.01) |

(52) U.S. Cl.
CPC ........ *B29D 11/00663* (2013.01); *G02B 6/005* (2013.01); *G02B 27/0172* (2013.01); *G02B 6/0046* (2013.01); *G02B 6/0055* (2013.01); *G02B 2027/013* (2013.01); *G02B 2027/0178* (2013.01)

(58) Field of Classification Search
CPC .... G02B 6/0046; G02B 26/02; G02B 6/0043; G02B 6/0061; G02B 6/0078; G02B 5/201; G02B 5/0875; G02B 6/0018; G02F 1/157; G02F 1/133555

USPC ............. 359/630, 633, 290, 296, 315, 322; 345/87
See application file for complete search history.

(56) References Cited

U.S. PATENT DOCUMENTS

| | | | |
|---|---|---|---|
| 2003/0165017 A1* | 9/2003 | Amitai | G02B 6/0018 |
| | | | 359/636 |
| 2006/0044286 A1* | 3/2006 | Kohlhaas | G02F 1/13338 |
| | | | 345/173 |
| 2007/0070270 A1* | 3/2007 | Yu | G02F 1/133555 |
| | | | 349/113 |
| 2007/0070859 A1 | 3/2007 | Hirayama | |

(Continued)

FOREIGN PATENT DOCUMENTS

| | | |
|---|---|---|
| JP | 06-337316 A | 12/1994 |
| JP | 2003-536102 A | 12/2003 |

(Continued)

*Primary Examiner* — Scott J Sugarman
*Assistant Examiner* — Daniele Manikeu
(74) *Attorney, Agent, or Firm* — ALG Intellectual Property, LLC (57) ABSTRACT

An optical element includes a light guide plate that has therein a light transmissive flat plate member on which a transflective layer is formed, and a layer of a light transmissive adhesive or a light transmissive resin layer that uniformly covers the light guide plate. The refractive index of the layer of the adhesive or the resin layer is set to a refractive index different from that of the light guide plate. A first surface of the layer of the adhesive or the resin layer that is on the light exit surface side of the light guide plate is kept parallel with a second surface of the layer of the adhesive or the resin layer that is on the opposite side to the light exit surface side of the light guide plate.

20 Claims, 6 Drawing Sheets

(56) References Cited

U.S. PATENT DOCUMENTS

| | | | |
|---|---|---|---|
| 2007/0188837 A1 | 8/2007 | Shimizu et al. | |
| 2012/0206675 A1* | 8/2012 | Seo | H01L 27/3211 349/96 |
| 2012/0300306 A1* | 11/2012 | Nagahama | G02B 1/10 359/601 |
| 2012/0306940 A1* | 12/2012 | Machida | G02B 6/005 345/690 |
| 2013/0234966 A1* | 9/2013 | Jhuang | G02B 27/286 345/173 |

FOREIGN PATENT DOCUMENTS

| | | |
|---|---|---|
| JP | 2006-162767 A | 6/2006 |
| JP | 2007-219106 A | 8/2007 |
| JP | 2009-145513 A | 7/2009 |
| JP | 2012-058404 A | 3/2012 |
| JP | 2012-088472 A | 5/2012 |

\* cited by examiner

FIG. 7

OPTICAL ELEMENT, IMAGE DISPLAY DEVICE AND METHOD FOR MANUFACTURING SAME

BACKGROUND

1. Technical Field

The present invention relates to an optical element such as a light guide plate, an image display device, and a method for manufacturing the optical element and the image display device.

2. Related Art

A virtual image display has a light source and a transmission type display element (e.g., LCD, OLED) that transmits light emitted from the light source. JP-T-2003-536102 proposes a virtual image display device that includes a light source emitting, as light including information, display light and a light guide plate disposed so as to reflect or diffract, toward a viewer, the light including the information so that a virtual image formed by the light guide plate is viewable in the front of the viewer.

According to JP-T-2003-536102, for example, a light guide plate having a multilayer structure is used as a light guide plate including a transflective layer. However, in the case of manufacturing a light guide plate having a multilayer structure, it is difficult to achieve accuracy in flatness and a mirror surface on the front and rear surfaces of the light guide plate. Furthermore, in the case of a multilayer structure, the transflective layer is exposed, and therefore there is a risk of film degradation.

SUMMARY

In view of the above circumstances, an advantage of some aspects of the invention is that an optical element that has high accuracy in flatness on front and rear surfaces thereof and is free from film degradation and inclusion of foreign substances or air bubbles even in a case where a light guide plate having a multilayer structure is used, a method for manufacturing the optical element, and an optical device are provided.

A first aspect of an optical element according to the invention includes: a light guide plate; a first light transmitting material that is disposed so as to be in contact with a first surface of the light guide plate; and a second light transmitting material that is disposed so as to be in contact with a second surface opposite to the first surface of the light guide plate; the light guide plate including a first part made of a light transmissive material, a second part made of a light transmissive material, and a first transflective layer disposed between the first part and the second part, the first transflective layer being disposed so as to be inclined with respect to the first surface and the second surface, the first light transmitting material, the second light transmitting material, the first part, and the second part having the same refractive index, and a surface of the first light transmitting material opposite to a surface that is in contact with the first surface being parallel with a surface of the second light transmitting material opposite to a surface that is in contact with the second surface.

According to the first aspect of the optical element according to the invention, the first light transmitting material that has the same refractive index as the first part and the second part of the light guide plate is disposed so as to be in contact with the first surface of the light guide plate; the second light transmitting material that has the same refractive index as the first part and the second part of the light guide plate is disposed so as to be in contact with the second surface opposite to the first surface of the light guide plate; and a surface of the first light transmitting material opposite to a surface that is in contact with the first surface is parallel with a surface of the second light transmitting material opposite to a surface that is in contact with the second surface. Accordingly, even in a case where a light exit surface and an opposing surface of the light guide plate including the first transflective layer are not parallel with each other, a light exit surface and an opposing surface of the optical element according to the first aspect including the first light transmitting material and the second light transmitting material are kept parallel with each other. It should be noted that even in a case where there is a difference in refractive index among the first light transmitting material, the second light transmitting material, the first part, and the second part, a difference of about ±10% in refractive index does not cause refraction and is therefore encompassed within "same".

A second aspect of an optical element according to the invention includes: a light guide plate; a first substrate that is disposed on a first surface side of the light guide plate and is made of a light transmissive material; a second substrate that is disposed on a second surface side opposite to the first surface side of the light guide plate and is made of a light transmissive material; a first light transmitting material that is disposed between the light guide plate and the first substrate; and a second light transmitting material disposed between the light guide plate and the second substrate, the light guide plate including a first part made of a light transmissive material, a second part made of a light transmissive material, and a first transflective layer disposed between the first part and the second part, the first transflective layer being disposed so as to be inclined with respect to the first surface and the second surface, the first light transmitting material, the second light transmitting material, the first part, and the second part having the same refractive index, the first substrate and the second substrate having a refractive index different from that of the first light transmitting material and the second light transmitting material, and a surface of the first substrate that is on the light guide plate side being parallel with a surface of the second substrate that is on the light guide plate side.

According to the second aspect of the optical element according to the invention, the first light transmitting material that has the same refractive index as the first part and the second part of the light guide plate is disposed between the light guide plate and the first substrate that is made of a light transmissive material and disposed on the first surface side of the light guide plate; the second light transmitting material that has the same refractive index as the first part and the second part of the light guide plate is disposed between the light guide plate and the second substrate that is made of a light transmissive material and disposed on the second surface side opposite to the first surface side of the light guide plate; and a surface of the first substrate on the light guide plate side is parallel with a surface of the second substrate on the light guide plate side. Accordingly, even in a case where a light exit surface and an opposing surface of the light guide plate including the first transflective layer are not parallel with each other, a light exit surface and an opposing surface of the optical element according to the second aspect including the first substrate, the second substrate, the first light transmitting material and the second light transmitting material are kept parallel with each other. It should be noted that even in a case where there is a difference in refractive index among the first light transmitting material, the second light transmitting material, the first part, and the second part, a difference of about ±10% in refractive index does not cause refraction and is therefore encompassed within "same".

The second aspect of the optical element according to the invention may be arranged such that the first surface of the light guide plate is inclined with respect to the surface of the first substrate that is on the light guide plate side; and the second surface of the light guide plate is inclined with respect to the surface of the second substrate that is on the light guide plate side. In this case, even in a case where the first surface of the light guide plate is inclined with respect to the surface of the first substrate that is on the light guide plate side and the second surface of the light guide plate is inclined with respect to the surface of the second substrate that is on the light guide plate side, a light exit surface and an opposing surface of the optical element are kept parallel with each other. This is because the surface of the first substrate that is on the light guide plate side is parallel with the surface of the second substrate that is on the light guide plate side.

The first or second aspect of the optical element according to the invention is preferably arranged such that the light guide plate includes a third part made of a light transmissive material and a second transflective layer disposed between the second part and the third part; the second transflective layer is disposed so as to be parallel with the first transflective layer; the second transflective layer reflects, toward the first surface side, at least part of light entering from the third part side and transmits the other part of the light entering from the third part side; and the first transflective layer reflects, toward the first surface side, at least part of light that has passed through the second transflective layer and entered from the second part side. In this case, light entering from the third part side travels toward the second part side while being reflected toward the first surface side by the second transflective layer, and is reflected by the first transflective layer toward the first surface side. That is, the incident light is emitted toward the first surface side while being guided. This makes it possible to display a large virtual image to a viewer.

The first or second aspect of the optical element according to the invention is preferably arranged such that reflectance of the first transflective layer on the second part side is higher than that of the second transflective layer on the third part side. In this case, even in a case where the optical path length is long, it is possible to avoid occurrence of brightness unevenness.

The first or second aspect of the optical element according to the invention is preferably arranged such that a perpendicular line from an end of the first transflective layer on the second surface side to the first surface intersects, on the first surface, with an end of the second transflective layer on the first surface side. In this case, the light exit surface has no region where reflected light does not reach. It is therefore possible to prevent occurrence of black stripes.

The first or second aspect of the optical element according to the invention is preferably arranged to further include a first light blocking layer disposed on a side of the first part opposite to the first transflective layer side. In this case, the light blocking layer blocks external light, and therefore there is no possibility that an image displayed on the light exit surface is hard to see.

The first or second aspect of the optical element according to the invention is preferably arranged to further include a second light blocking layer disposed on a side of the second light transmitting material opposite to the light guide plate side. In this case, the light blocking layer blocks external light, and therefore there is no possibility that an image displayed on the light exit surface is hard to see.

The first or second aspect of the optical element according to the invention is preferably arranged to further include: a light transmissive introduction block that introduces light into the light guide plate; and a mirror that reflects light toward the introduction block. In this case, light is introduced into the light guide plate by the mirror and the introduction block, and the light that has entered the light guide plate is reflected while being guided. This makes it possible to display a large virtual image to a viewer.

A first aspect of a method for manufacturing an optical element according to the invention includes: mounting a light guide plate in a rectangular recess of a mold, opposing surfaces of the rectangular recess being parallel with each other; filling a gap between the rectangular recess and the light guide plate with a curable light transmitting material; and curing the curable light transmitting material; the light guide plate including a first part made of a light transmissive material, a second part made of a light transmissive material, and a first transflective layer disposed between the first part and the second part, the first transflective layer being disposed so as to be inclined with respect to the first surface and the second surface, and the curable light transmitting material, the first part, and the second part having the same refractive index.

A second aspect of a method for manufacturing an optical element according to the invention includes: coating a light guide plate with a curable light transmitting material; sandwiching the light guide plate which has been coated with the curable light transmitting material between a first substrate made of a light transmissive material and a second substrate made of a light transmissive material; and curing the curable light transmitting material in a state in which a surface of the first substrate on the light guide plate side is parallel with a surface of the second substrate on the light guide plate side, the light guide plate including a first part made of a light transmissive material, a second part made of a light transmissive material, and a first transflective layer disposed between the first part and the second part, the first transflective layer being disposed so as to be inclined with respect to the first surface and the second surface, and the curable light transmitting material, the first part, and the second part having the same refractive index.

In the first or second aspect of the method for manufacturing an optical element according to the invention, the light guide plate is created by vapor-depositing the first transflective layer on one surface of a first flat plate member that serves as the first part, stacking a second flat plate member that serves as the second part on the one surface side of the first flat plate member so that the first flat plate member and the second flat plate member are shifted from each other in accordance with an inclination angle of the first transflective layer, and cutting the first flat plate member and the second flat plate member thus stacked on each other.

Next, an image display device according to the invention includes the optical element according to the invention. Such an image display device may include an image formation section such as a liquid crystal display and a collimating optical system, and can be applied to a form, such as a head-mounted display, that is mounted on the head of a viewer.

BRIEF DESCRIPTION OF THE DRAWINGS

The invention will be described with reference to the accompanying drawings, wherein like numbers reference like elements.

FIGS. 6A to 6C are schematic views for explaining the positions of transflective layers of a light guide plate according to the fourth embodiment, where

DESCRIPTION OF EXEMPLARY EMBODIMENTS

Various embodiments of the invention are described below with reference to the attached drawings. It should be noted that a ratio of dimensions of members illustrated in the drawings is different from the actual one as appropriate. In the embodiments below, a case where an optical element according to the invention is applied to a head-mounted display, which is one example of an image display device mounted on the head of a viewer, is described as an example. However, each of these embodiments is merely one aspect of the invention and does not limit the invention. These embodiments can be modified in any ways within the scope of the technical idea of the invention.

First Embodiment

Figure 1:
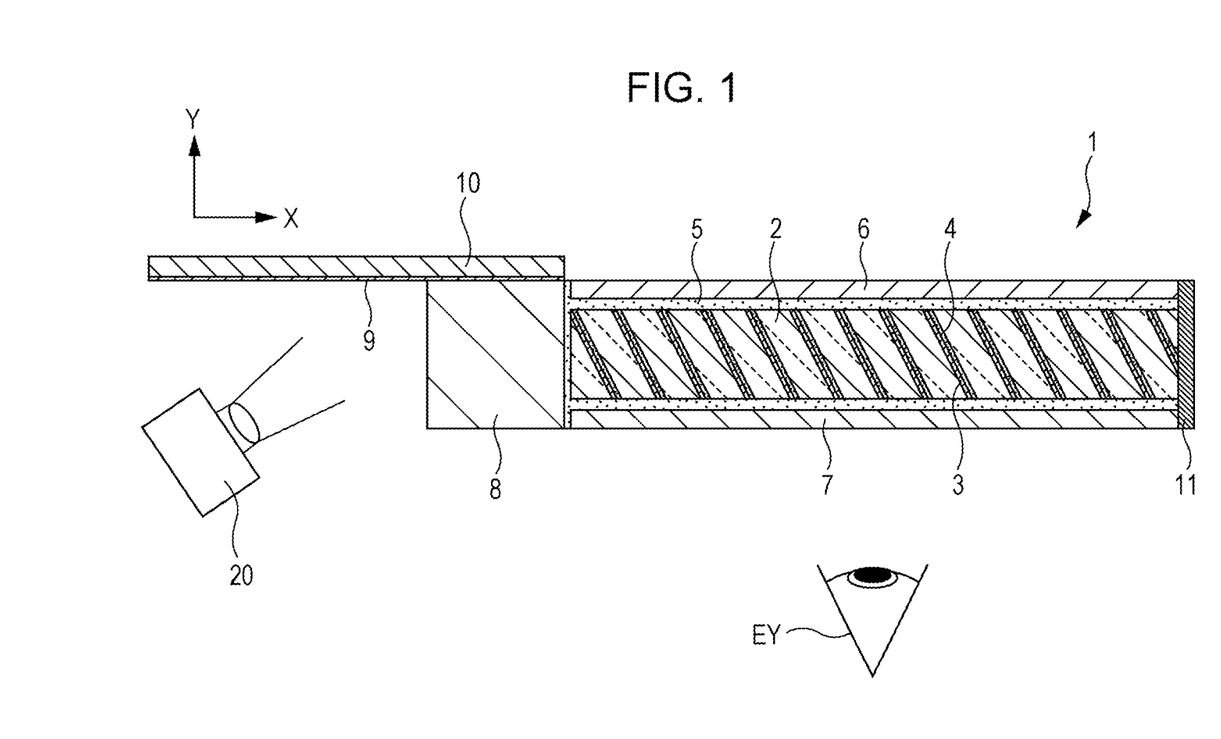
FIG. 1 is a side view illustrating an optical device according to the first embodiment.

FIG. 1 is a side view illustrating the whole image of an optical device 1 according to the first embodiment. As illustrated in FIG. 1, the optical device 1 includes a light guide plate 2, an upper flat plate 6, a lower flat plate 7, an introduction block 8, an incident light intake mirror 9, and a mirror supporting plate 10.

Figure 2:
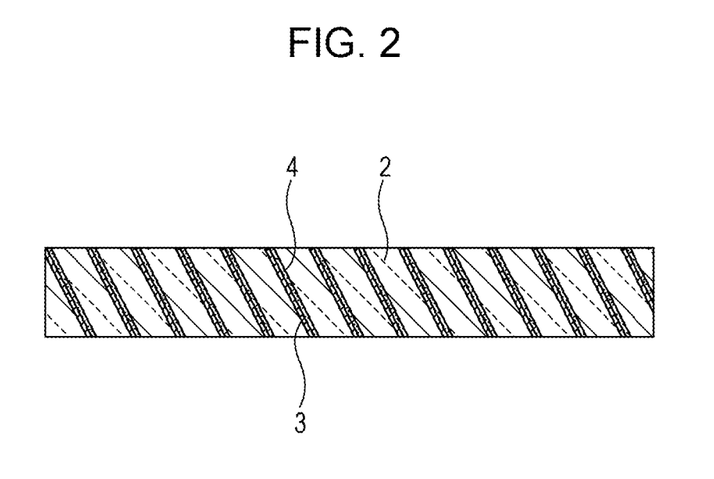
FIG. 2 is a side view illustrating a light guide plate.

As illustrated in FIG. 2, the light guide plate 2 is created by (i) forming a transflective layer 3 on plate-like members made of a material such as a light transmissive resin material by a method such as vapor deposition, (ii) bonding, with an adhesive 4, such plate-like members on which the transflective layer 3 has been formed so that the plate-like members are shifted from each other in accordance with an inclination angle, and (iii) cutting the plate-like members thus bonded.

The light guide plate 2 is bonded to the upper flat plate 6 and the lower flat plate 7 with an adhesive 5, and the upper flat plate 6 and the lower flat plate 7 are kept parallel with each other by pressing. The refractive index of the adhesive 5 is set to a refractive index the same as or close to that of the light guide plate 2.

The upper flat plate 6 is a plate-like member made of a material such as a light transmissive resin material. Assume that the Y direction in FIG. 1 is an upward direction, at least a topmost surface of the upper flat plate 6 is flat. The refractive index of the upper flat plate 6 is set to a refractive index different from that of the adhesive 5 and the light guide plate 2. As described above, the upper flat plate 6 and the lower flat plate 7 are kept parallel with each other by pressing. Furthermore, the upper flat plate 6 is desirably formed so that a surface thereof that is bonded to the introduction block 8 is flat. It should be noted that, instead of using the adhesive 5, such an arrangement is also possible in which the light guide plate 2 is sandwiched between the upper flat plate 6 and the lower flat plate 7 and a gap between the light guide plate 2 and the upper flat plate 6 and a gap between the light guide plate 2 and the lower flat plate 7 are filled with a resin. In this case, the refractive index of the resin 5 is set to a refractive index the same as or close to that of the light guide plate 2.

The lower flat plate 7 is a plate-like member made of a material such as a light transmissive resin material. Assume that the Y direction in FIG. 1 is an upward direction, a bottommost surface of the lower flat plate 7 is flat. The refractive index of the lower flat plate 7 is set to the same refractive index as the upper flat plate 6. As described above, the upper flat plate 6 and the lower flat plate 7 are kept parallel with each other by pressing. Furthermore, the lower flat plate 7 is desirably formed so that a surface thereof that is bonded to the introduction block 8 is flat.

The introduction block 8 is a member made of a material such as a light transmissive resin material, and at least opposing surfaces of the introduction block 8 are parallel with each other. The height of the introduction block 8 in the Y direction of FIG. 1 is equal to a distance in the Y direction from the topmost surface of the upper flat plate 6 to the bottommost surface of the lower flat plate 7. The upper flat plate 6 and the lower flat plate 7 are connected to the introduction block 8 at right angles.

The incident light intake mirror 9 is bonded onto the mirror supporting plate 10 made of a material such as a light transmissive resin material. Assume that the Y direction in FIG. 1 is an upward direction, an end of the incident light intake mirror 9 is attached to the top surface of the introduction block 8.

A light blocking layer 11 made of, for example, a black coating material is provided on ends, in the X direction in FIG. 1, of the upper flat plate 6, the lower flat plate 7, and the light guide plate 2.

In the optical device 1 described above, when image light is projected from an image display source 20, the image light is reflected by the incident light intake mirror 9 and is then guided to the light guide plate 2 by the introduction block 8. Part of the light guided to the light guide plate 2 is reflected by the transflective layer 3 and then reaches the eyes EY of a viewer. Part of the reflected light travels inside the light guide plate 2 while being reflected by the upper flat plate 6 and the lower flat plate 7. Furthermore, light that was not reflected by the transflective layer 3 also travels inside the light guide plate 2 while being reflected by the upper flat plate 6 and the lower flat plate 7. At least the topmost surface of the upper flat plate 6 and the bottommost surface of the lower flat plate 7 are flat and are kept parallel with each other. Therefore, light reflected by the upper flat plate 6 and the lower flat plate 7 is guided in a state in which total reflection conditions are satisfied. As a result, there is no loss of light.

As described above, the light guide plate 2 is created by (i) forming the transflective layer 3 on a plate-like member made of a material such as a light transmissive resin material by a method such as vapor deposition, (ii) bonding, with the adhesive 4, such plate-like members on which the transflective layer 3 has been formed so that the plate-like members are shifted from each other in accordance with an inclination angle, and (iii) cutting the plate-like members thus bonded. It is therefore difficult to achieve flatness of the top surface and the bottom surface of the light guide plate 2 and to keep the top surface and the bottom surface of the light guide plate 2 parallel with each other.

However, the light guide plate 2 according to the present embodiment is bonded to the upper flat plate 6, which is formed so that at least the topmost surface is flat, and the lower flat plate 7, which is formed so that at least the bottommost surface is flat, with the adhesive 5. Furthermore, at least the topmost surface of the upper flat plate 6 and the bottommost surface of the lower flat plate 7 are kept parallel with each other by pressing.

Therefore, even in the case of using the light guide plate 2 having a multilayer structure, in a case where the upper flat plate 6, the lower flat plate 7, and the light guide plate 2 are considered a monolithic light guide plate, it is possible to secure flatness of the top surface and the bottom surface of the light guide plate and to keep the top surface and the bottom surface parallel with each other well. The flatness just needs to be the same degree of flatness as that of a flat plate member used in the formation of the light guide plate 2.

Furthermore, the gap between the upper flat plate 6 and the light guide plate 2 and the gap between the lower flat plate 7 and the light guide plate 2 are filled with the adhesive 5. Therefore, even in a case where the transflective layer 3 is exposed in the process of creating the light guide plate 2 having a multilayer structure, it is possible to prevent degradation of the transflective layer 3 since the transflective layer 3 is covered with the adhesive 5.

Furthermore, in the present embodiment, the light blocking layer 11 is provided on the ends. This makes it possible to block external light with certainty. As a result, there is no possibility that an image is hard to see.

As described above, according to the present embodiment, it is possible to provide an optical element that is capable of displaying a virtual image well while solving the problems of a light guide plate having a multilayer structure.

Second Embodiment

Figure 3:
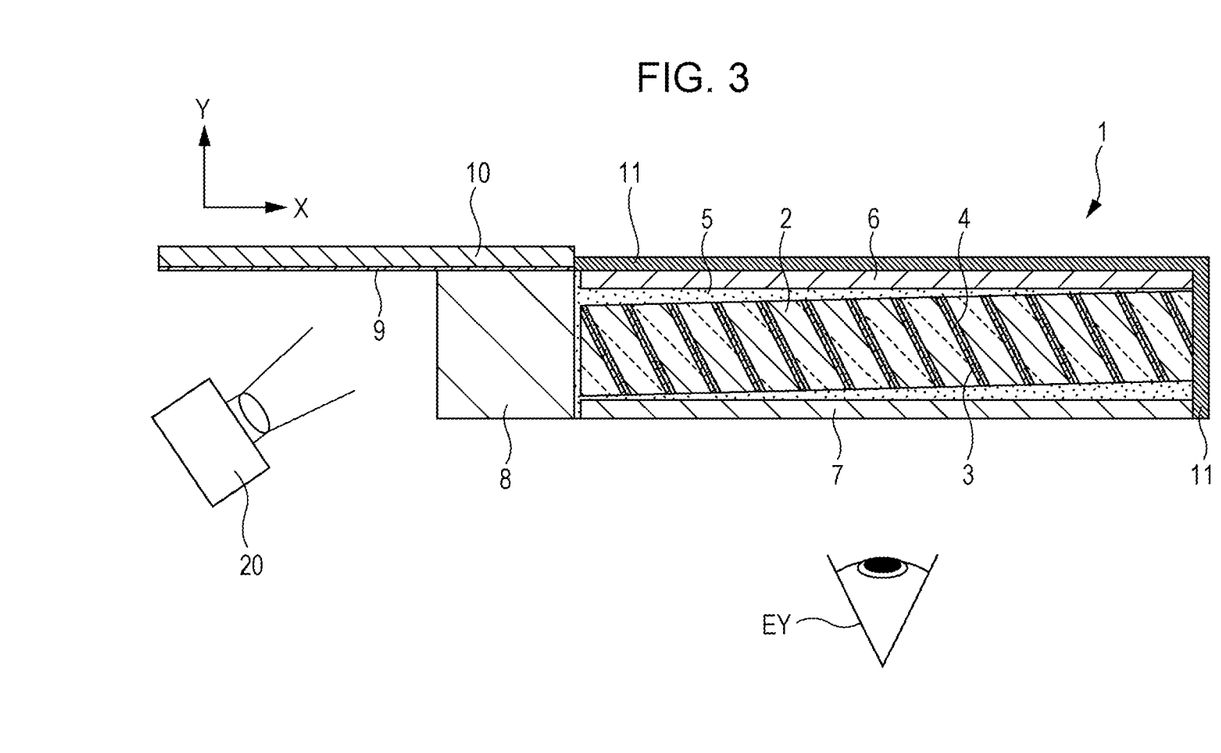
FIG. 3 is a side view illustrating an optical device according to the second embodiment.

The second embodiment of the invention is described with reference to FIG. 3. As illustrated in FIG. 3, a light guide plate 2 may be bonded in an inclined state to an upper flat plate 6 and a lower flat plate 7. Even in such a case where the light guide plate 2 is inclined, a gap between the upper flat plate 6 and the light guide plate 2 and a gap between the lower flat plate 7 and the light guide plate 2 are filled with an adhesive 5, and therefore flatness of a topmost surface of the upper flat plate 6 and a bottommost surface of the lower flat plate 7 can be achieved and the topmost surface of the upper flat plate 6 and the bottommost surface of the lower flat plate 7 can be kept parallel with each other. Also in the present embodiment, surface roughness of the top surface and the bottom surface of the light guide plate 2 itself can be covered by the adhesive 5, and the parallelism of the top surface and the bottom surface can be secured by the upper flat plate 6 and the lower flat plate 7.

In a case where the optical device 1 is not a see-through type, a light blocking layer 11 made of a material such as a black coating material may be formed on surfaces other than a display surface that faces the eyes EY of a viewer as illustrated in FIG. 3. Alternatively, the light blocking layer 11 may be formed on surfaces other than a light incident part and a light exit part.

Third Embodiment

The third embodiment of the invention is described with reference to FIGS. 4 and 5. In the first embodiment and the second embodiment, an example in which an upper flat plate 6 and a lower flat plate 7 are bonded to a light guide plate 2 with an adhesive 5 has been described. However, the invention is not limited to this example.

Figure 4:
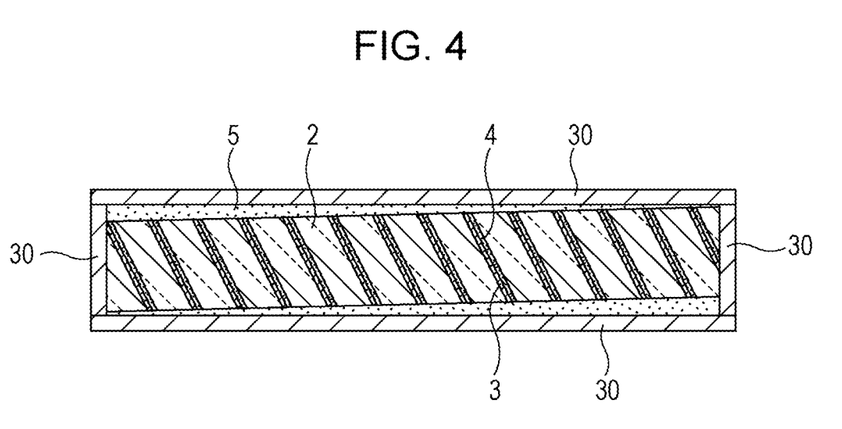
FIG. 4 is a side view for explaining a method for manufacturing a light guide plate according to the third embodiment.
Figure 5:
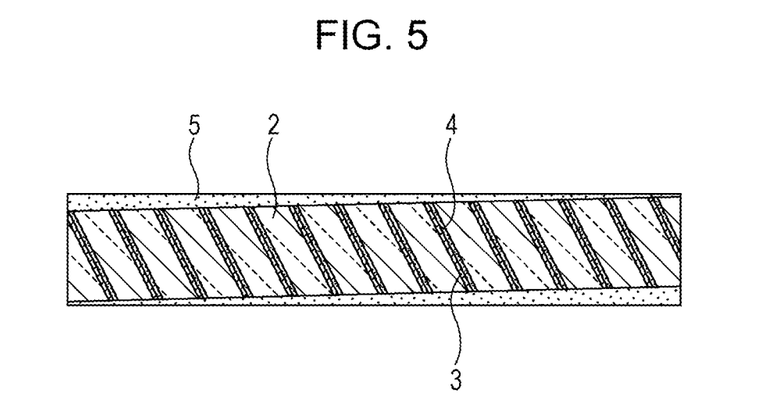
FIG. 5 is a side view illustrating a light guide plate that is integrally formed with an adhesive layer.

For example, it is possible that a light guide plate 2 be placed in a mold 30 whose top and bottom surfaces are kept parallel with each other and whose left and right surfaces are kept parallel with each other and the mold 30 be filled with an adhesive 5 or a resin as illustrated in FIG. 4. The light guide plate 2 that has been unified with the adhesive 5 or the resin can be obtained by removing the mold 30 as illustrated in FIG. 5 after the adhesive 5 or the resin is cured. In this case, flatness and parallelism of a top surface and a bottom surface of the adhesive 5 or the resin can be kept. It should be noted that the flatness just needs to be the same degree of flatness as that of a flat plate member used for creation of the light guide plate 2.

Fourth Embodiment

Figure 6A:
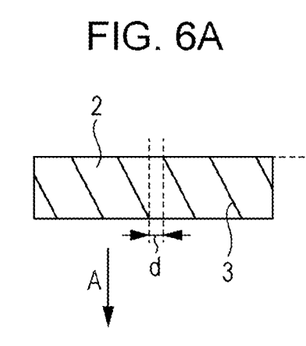
FIG. 6A is a schematic view for explaining the positional relationship between the transflective layers in a case where black stripes occur.

The fourth embodiment of the invention is described with reference to FIGS. 6A to 6C. As illustrated in FIG. 6A, in a light guide plate 2 having a multilayer structure, in a case where there is a distance d between an end of one transflective layer 3 and an end of another transflective layer 3 adjacent to the one transflective layer 3 in a direction parallel with the light exit direction A, reflected light does not exit from a region in the distance d. Consequently, there are cases where black stripes appear in a displayed image.

Figure 6B:
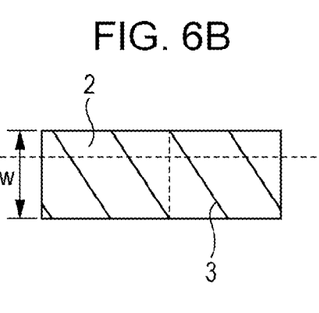
FIG. 6B is a schematic view for explaining the positional relationship between the transflective layers in a case where the thickness of the light guide plate is increased.

In view of this, in the present embodiment, in a case where light transmissive resin materials that are stacked on each other have the same thickness, the thickness w of the light guide plate 2 in the light exit direction A may be increased as illustrated in FIG. 6B so that the distance d between an end of one transflective layer 3 and an end of another transflective layer 3 adjacent to the one transflective layer 3 is eliminated.

Figure 6C:
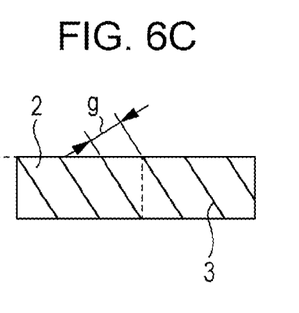
FIG. 6C is a schematic view for explaining the positional relationship between the transflective layers in a case where the thickness of light transmissive resin materials stacked in the light guide plate is reduced.

Alternatively, the thickness g of each of the light transmissive resin materials that are stacked on each other may be reduced as illustrated in FIG. 6C so that the distance d between an end of one transflective layer 3 and an end of another transflective layer 3 adjacent to the one transflective layer 3 is eliminated.

It is possible to display a desirable image with no black stripe by configuring an optical device 1 as described in the first through third embodiments with the use of the light guide plate 2 configured so that the distance d between an end of one transflective layer 3 and an end of another transflective layer 3 adjacent to the one transflective layer 3 is eliminated as illustrated in FIGS. 6B and 6C.

There are cases where bright stripes appear in a case where an end of one transflective layer 3 and an end of another transflective layer 3 adjacent to the one transflective layer 3 overlap too much in a direction parallel with the light exit direction A. It is therefore preferable that the light guide plate 2 be configured so that the distance d between an end of one transflective layer 3 and an end of another transflective layer 3 adjacent to the one transflective layer 3 is eliminated and to such a degree that bright stripes do not appear.

Modifications

The invention is not limited to the above embodiments and can be modified in various ways as described below. It is of course possible to appropriately combine the embodiments and the modifications.

(1) The inclination angle and pitch of transflective layers can be changed as appropriate as long as black stripes do not appear.

(2) Each of the transflective layers may have a higher reflectance as its optical path length from a light introducing part of a light guide plate increases. In this case, the reflectance may be successively varied depending on the increase in optical path length or may be varied in stages depending on the increase in optical path length. In this way, even in a case where a transflective layer is away from the light introducing part and has a long optical path length, it is possible to avoid occurrence of luminance unevenness.

(3) The configuration of the optical element is not limited to those described in the above embodiments. An optical element having any configuration may be used as long as it is a light guide plate bonded to an upper flat plate and a lower flat plate with an adhesive or a light guide plate coated with an adhesive by a method such as molding.

Applications

The optical element according to the invention is applicable, for example, to a head-mounted display (HMD), which is one example of an image display device including a light guide plate. Such a head-mounted display is described with reference to FIG. 7.

Figure 7:
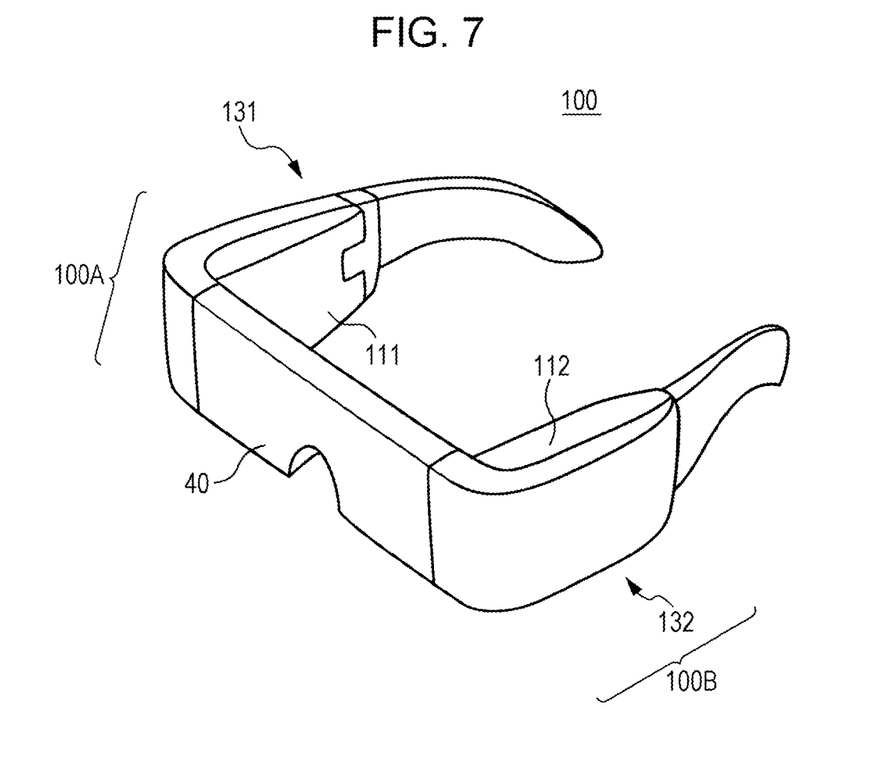
FIG. 7 is a perspective view illustrating a head-mounted display according to the application.

FIG. 7 is a perspective view illustrating an example of the whole image of a head-mounted display 100 according to the application. As illustrated in FIG. 7, the head-mounted display 100 according to the present embodiment is a head-mounted display having an eyeglass-like appearance. A viewer who wears this head-mounted display 100 can recognize image light of a virtual image and observe an outside image in a see-through manner.

Specifically, the head-mounted display 100 includes a light guide plate 40, a pair of left and right temples 131 and 132 that support the light guide plate 40, and a pair of image forming apparatuses 111 and 112 attached to the temples 131 and 132. A first display device 100A which is a combination of the left side of the light guide plate 40 and the image forming apparatus 111 in FIG. 7 is a part for formation of a virtual image for a right eye and functions as an image display device independently. A second display device 100A which is a combination of the right side of the light guide plate 40 and the image forming apparatus 112 in FIG. 7 is a part for formation of a virtual image for a left eye and functions as an image display device independently.

In this head-mounted display 100, the optical element illustrated in FIG. 1 can be used as the light guide plate of an optical system for a left eye and the optical element illustrated in FIG. 1 whose left and right sides are reversed can be used as the light guide plate of an optical system for a right eye.

The entire disclosure of Japanese Patent Application No. 2013-236596, filed Nov. 15, 2013 is expressly incorporated by reference herein.

What is claimed is:

1. An optical element comprising:
a light guide plate;
a first light transmitting material that is disposed so as to be in contact with a first surface of the light guide plate; and
a second light transmitting material that is disposed so as to be in contact with a second surface opposite to the first surface of the light guide plate;
the light guide plate including a first part made of a light transmissive material, a second part made of a light transmissive material, and a first transflective layer disposed between the first part and the second part,
the first transflective layer being disposed so as to be inclined with respect to the first surface and the second surface and so as to extend from the first surface to the second surface,
the first light transmitting material, the second light transmitting material, the first part, and the second part having the same refractive index, and
a surface of the first light transmitting material opposite to a surface that is in contact with the first surface being parallel with a surface of the second light transmitting material opposite to a surface that is in contact with the second surface.

2. An optical element comprising:
a light guide plate;
a first substrate that is disposed on a first surface side of the light guide plate and is made of a light transmissive material;
a second substrate that is disposed on a second surface side opposite to the first surface side of the light guide plate and is made of a light transmissive material;
a first light transmitting material that is disposed between the light guide plate and the first substrate; and
a second light transmitting material disposed between the light guide plate and the second substrate,
the light guide plate including a first part made of a light transmissive material, a second part made of a light transmissive material, and a first transflective layer disposed between the first part and the second part,
the first transflective layer being disposed so as to be inclined with respect to the first surface and the second surface,
the first light transmitting material, the second light transmitting material, the first part, and the second part having the same refractive index,
the first substrate and the second substrate having a refractive index different from that of the first light transmitting material and the second light transmitting material, and
a surface of the first substrate that is on the first surface side of the light guide plate being parallel with a surface of the second substrate that is on the second surface side of the light guide plate.

3. The optical element according to claim 2, wherein the first surface of the light guide plate is inclined with respect to the surface of the first substrate that is on the first surface side of the light guide plate, and
the second surface of the light guide plate is inclined with respect to the surface of the second substrate that is on the second surface side of the light guide plate.

4. The optical element according to claim 1, wherein the light guide plate includes a third part made of a light transmissive material and a second transflective layer disposed between the second part and the third part, the second transflective layer is disposed so as to be parallel with the first transflective layer, the second transflective layer reflects, toward a first surface side of the light guide plate, at least part of light entering from a third part side and transmits another part of the light entering from the third part side, and the first transflective layer reflects, toward the first surface side, at least part of light that has passed through the second transflective layer and entered from a second part side.

5. The optical element according to claim 2, wherein
the light guide plate includes a third part made of a light transmissive material and a second transflective layer disposed between the second part and the third part,
the second transflective layer is disposed so as to be parallel with the first transflective layer,
the second transflective layer reflects, toward the first surface side, at least part of light entering from a third part side and transmits another part of the light entering from the third part side, and
the first transflective layer reflects, toward the first surface side, at least part of light that has passed through the second transflective layer and entered from a second part side.

6. The optical element according to claim 4, wherein reflectance of the first transflective layer on the second part side is higher than that of the second transflective layer on the third part side.

7. The optical element according to claim 5, wherein reflectance of the first transflective layer on the second part side is higher than that of the second transflective layer on the third part side.

8. The optical element according to claim 4, wherein a perpendicular line from an end of the first transflective layer on the second surface side to the first surface intersects, on the first surface, with an end of the second transflective layer on the first surface side.

9. The optical element according to claim 5, wherein a perpendicular line from an end of the first transflective layer on the second surface side to the first surface intersects, on the first surface, with an end of the second transflective layer on the first surface side.

10. The optical element according to claim 1, further comprising a first light blocking layer disposed on a side of the first part opposite to the first transflective layer side.

11. The optical element according to claim 2, further comprising a first light blocking layer disposed on a side of the first part opposite to the first transflective layer side.

12. The optical element according to claim 1, further comprising a second light blocking layer disposed on a side of the second light transmitting material opposite to a first surface side of the light guide plate.

13. The optical element according to claim 2, further comprising a second light blocking layer disposed on a side of the second light transmitting material opposite to the first surface side of the light guide plate.

14. The optical element according to claim 1, further comprising:
a light transmissive introduction block that introduces light into the light guide plate; and
a mirror that reflects light toward the introduction block.

15. The optical element according to claim 2, further comprising:
a light transmissive introduction block that introduces light into the light guide plate; and
a mirror that reflects light toward the introduction block.

16. A method for manufacturing an optical element, the method comprising:
mounting a light guide plate in a rectangular recess of a mold, opposing surfaces of the rectangular recess being parallel with each other;
filling a gap between the rectangular recess and the light guide plate with a curable light transmitting material such that the curable light transmitting material is in contact with a first surface of the light guide plate and a second surface of the light guide plate that is opposite to the first surface; and
curing the curable light transmitting material;
the light guide plate including a first part made of a light transmissive material, a second part made of a light transmissive material, and a first transflective layer disposed between the first part and the second part,
the first transflective layer being disposed so as to be inclined with respect to the first surface and the second surface and so as to extend from the first surface to the second surface, and
the curable light transmitting material, the first part, and the second part having the same refractive index.

17. A method for manufacturing an optical element, the method comprising:
coating a light guide plate with a curable light transmitting material such that the curable light transmitting material is in contact with a first surface of the light guide plate and a second surface of the light guide plate that is opposite to the first surface;
sandwiching the light guide plate which has been coated with the curable light transmitting material between a first substrate made of a light transmissive material and a second substrate made of a light transmissive material; and
curing the curable light transmitting material in a state in which a surface of the first substrate on a first surface side of the light guide plate is parallel with a surface of the second substrate on a second surface side of the light guide plate,
the light guide plate including a first part made of a light transmissive material, a second part made of a light transmissive material, and a first transflective layer disposed between the first part and the second part,
the first transflective layer being disposed so as to be inclined with respect to the first surface and the second surface and so as to extend from the first surface to the second surface, and
the curable light transmitting material, the first part, and the second part having the same refractive index.

18. The method according to claim 16, wherein:
the light guide plate is created by
vapor-depositing the first transflective layer on one surface of a first flat plate member that serves as the first part,
stacking a second flat plate member that serves as the second part on the one surface side of the first flat plate member so that the first flat plate member and the second flat plate member are shifted from each other in accordance with an inclination angle of the first transflective layer, and
cutting the first flat plate member and the second flat plate member thus stacked on each other.

19. The method according to claim 17, wherein:
the light guide plate is created by
vapor-depositing the first transflective layer on one surface of a first flat plate member that serves as the first part, stacking a second flat plate member that serves as the second part on the one surface side of the first flat plate member so that the first flat plate member and the second flat plate member are shifted from each other in accordance with an inclination angle of the first transflective layer, and cutting the first flat plate member and the second flat plate member thus stacked on each other.

20. An image display device comprising the optical element according to claim 1.

* * * * *